(12) United States Patent
Kalenian

(10) Patent No.: US 6,887,506 B2
(45) Date of Patent: May 3, 2005

(54) COFFEE SYSTEM

(75) Inventor: Paul A. Kalenian, Princeton, MA (US)

(73) Assignee: X Cafe LLC, Princeton, MA (US)

( * ) Notice: Subject to any disclaimer, the term of this patent is extended or adjusted under 35 U.S.C. 154(b) by 0 days.

(21) Appl. No.: 10/357,135

(22) Filed: Feb. 3, 2003

(65) Prior Publication Data
US 2003/0118707 A1 Jun. 26, 2003

Related U.S. Application Data

(60) Continuation of application No. 09/731,677, filed on Dec. 6, 2000, now Pat. No. 6,548,094, which is a division of application No. 09/167,646, filed on Oct. 6, 1998, now Pat. No. 6,203,837.

(51) Int. Cl.⁷ .............................. A23L 1/28; A23F 5/24; A23F 2/26; A23F 3/16; A23F 3/18
(52) U.S. Cl. .................. 426/433; 426/431; 426/432; 426/435; 426/436
(58) Field of Search ............................. 426/431, 432, 426/433, 435, 436

(56) References Cited

U.S. PATENT DOCUMENTS

| | | |
|---|---|---|
| 3,228,876 A | 1/1966 | Mahon |
| 3,261,507 A | 7/1966 | Cornelius |
| 3,349,691 A | 10/1967 | Austin et al. |
| 3,582,351 A | 6/1971 | Austin et al. |
| 3,607,280 A | 9/1971 | Durchholz |
| 3,762,930 A | 10/1973 | Mahlmann |
| 3,788,860 A | 1/1974 | Mahlmann |
| 3,790,689 A | 2/1974 | Pitchon et al. |
| 3,830,940 A | 8/1974 | Sivetz |
| 3,995,067 A | 11/1976 | Marsh et al. |
| 4,158,329 A | 6/1979 | McKnight |
| 4,189,991 A | 2/1980 | Haddad |
| 4,414,113 A | 11/1983 | LaTerra |
| 4,505,191 A | 3/1985 | Longo |
| 4,534,985 A | 8/1985 | Gasau |
| 4,633,771 A | 1/1987 | Anderl |
| 4,721,035 A | 1/1988 | Chang-Diaz |

(Continued)

FOREIGN PATENT DOCUMENTS

| | | |
|---|---|---|
| DE | 33 18317 A1 | 11/1984 |
| DE | 197 06 005 A1 | 8/1998 |
| EP | 0 256 567 A2 | 2/1988 |
| EP | 0 412 496 A2 | 2/1991 |
| EP | 0 812 558 A1 | 12/1997 |
| JP | 4-45747 | 2/1992 |
| NL | 6803767 A | 5/1968 |
| WO | WO 01/30173 A2 | 5/2001 |

OTHER PUBLICATIONS

*Sheu, M.J. & R.C. Wiley, "Preconcentration of Apple Juice by Reverse Osmosis", *Journal of Food Science*, vol. 48, pp. 422–429, 1983.
*Schauwecker, P. "Nanofiltration of apple juice", *Flüssiges Obst*, vol. 61, No. 9, 1994, abstract only.

(Continued)

Primary Examiner—Anthony Weier
(74) Attorney, Agent, or Firm—Wolf, Greenfield & Sacks, P.C.

(57) ABSTRACT

Typical current methods for producing large quantities of extracts from solid raw materials such as ground, roasted coffee are designed for exhaustive extraction. Such methods are not ideally suited to producing high quality coffee extracts that are rich in flavor and fragrance, and which maintain the varietal characteristics of the roasted coffee from which they are produced. The current invention provides methods and apparatus for producing such high quality extracts. The invention provides methods that have sufficient flexibility and scalability to be used for a wide variety of applications, including for producing industrial-scale quantities of extracts for the food and beverage industry. The invention provides methods and apparatus that can produce highly concentrated, "gourmet quality" extracts for use as flavoring agents, beverage concentrates, and fragrances.

37 Claims, 4 Drawing Sheets

U.S. PATENT DOCUMENTS

| | | |
|---|---|---|
| 4,882,982 A | 11/1989 | Muttoni |
| 4,998,462 A | 3/1991 | Sekiguchi |
| 5,041,245 A | 8/1991 | Benado |
| 5,043,178 A | 8/1991 | Gottesman et al. |
| 5,114,731 A | 5/1992 | Belville et al. |
| 5,127,318 A | 7/1992 | Selby, III |
| 5,168,794 A | 12/1992 | Glucksman |
| 5,204,136 A | 4/1993 | Hellemons |
| 5,230,278 A | 7/1993 | Bunn et al. |
| 5,255,593 A | 10/1993 | Bunn et al. |
| 5,267,506 A | 12/1993 | Cai |
| 5,297,472 A | 3/1994 | Suzuki et al. |
| 5,303,639 A | 4/1994 | Bunn et al. |
| 5,337,652 A | 8/1994 | Fischer et al. |
| 5,372,832 A | 12/1994 | Bunn et al. |
| 5,393,540 A | 2/1995 | Bunn et al. |
| 5,473,973 A | 12/1995 | Cortese |
| 5,497,792 A | 3/1996 | Prasad et al. |
| 5,525,746 A | 6/1996 | Franke |
| 5,638,740 A | 6/1997 | Cai |
| 5,699,719 A | 12/1997 | Lucas et al. |
| 5,704,950 A | 1/1998 | Putatunda |
| 5,707,673 A | 1/1998 | Prevost et al. |
| 5,739,364 A | 4/1998 | Franke |
| 6,203,837 B1 | 3/2001 | Kalenian |
| 6,548,094 B2 | 4/2003 | Kalenian |

OTHER PUBLICATIONS

*Abstract (English): JP 02–138938, Mizuki, May 27, 1968.
*International Search Report for PCT/US99/23178 (Oct. 24, 2000).
Written Opinion for PCT/US99/23178 (Jan. 31, 2001).
International Preliminary Examination Report for PCT/US99/23178 (Apr. 25, 2001).
* International Search Report or the Declaration for PCT/US00/29651 (Jun. 19, 2001).
Written Opinion for PCT/US00/29651 (Nov. 01, 2001).
International Preliminary Examination Report PCT/US00/29651 (Jan. 23, 2002).

COFFEE SYSTEM

RELATED APPLICATIONS

This application is a continuation of U.S. application Ser. No. 09/731,677, filed Dec. 6, 2000, and now U.S. Pat. No. 6,548,094, issued on Apr. 15, 2003, which is a divisional of U.S. application Ser. No. 09/167,646, filed Oct. 6, 1998 and now U.S. Pat. No. 6,203,837, issued on Mar. 20, 2001.

FIELD OF THE INVENTION

The present invention relates to methods and systems for producing a consumable aqueous extract from a solid raw material. Specific embodiments of the invention involve methods for forming concentrated aqueous extracts of roasted coffee useful in food, fragrance, and beverage products.

BACKGROUND OF THE INVENTION

A variety of solid raw materials are commonly extracted with aqueous solvents, such as hot water, to form consumable aqueous extracts for use in foods, fragrances, or beverages. Common materials include roasted ground coffee, tea, and cocoa just to name a few. Typical and representative of currently employed methods and systems for performing such extractions are those used for brewing and extracting roasted coffee. Generally the prior art systems fall into two broad categories: small-scale home or commercial brewing equipment for producing beverages; and large-scale industrial extractors for producing concentrated extracts for use as flavorings or as raw materials for the production of instant coffee products. When used for the production of instant coffee products, the aqueous solvent is typically removed from the dissolved coffee solids by processes such as freeze drying or spray drying.

Typical prior art large-scale coffee extractors and associated extraction methods, especially when used to produce coffee extracts for the subsequent production of instant coffee, are designed to maximize the yield of soluble coffee solids in the extract from a given quantity of ground roasted coffee. This is done for economic reasons: the more soluble coffee solids extracted from a given quantity of roasted coffee raw material, the greater the quantity of final instant coffee product derived upon removal of the water. To this end, typical prior art large-scale coffee extractors are designed for the exhaustive extraction of typically low-grade ground coffee and not for production of a high quality, flavorful, fragrant extract. Many typical prior art extractor systems of this type employ one or more columns having fixed beds of ground roasted coffee. Representative of such a system is the one described in U.S. Pat. No. 3,830,940 to Sivetz. Many prior art systems employ circulation of hot water through the columns where the water flows into the bottom of each column and exits from the top, thus tending to expand and agitate the bed. Very hot extraction water, often in excess of 160 degrees C., is often fed to the column containing the most spent coffee (the coffee that has had the most solids already extracted) in order to thermally hydrolyze the coffee to enable extraction of additional solids, which are essentially free of flavor and fragrance. Often, the extract may be recycled through the columns to further increase the extent of the extraction of the ground roasted coffee. While such systems and methods are useful for exhaustive extraction, they are not ideally suited for producing high quality coffee extracts with desirable sweetness and flavor characteristics. The relatively long extraction times (for example greater than 1 hour), high water temperatures, and levels of dilution used in certain prior art extraction processes can result in extracts having a relatively high concentration of components that are bitter or have poor flavor characteristics, which are often passed on to the dried instant coffee products produced from such extracts. Many of the concentrated coffee extracts commonly employed as flavor components in the food industry (e.g. as flavorings for coffee ice cream, iced coffee beverages, and coffee syrups) are produced by reconstituting such poor quality instant coffee products with water or other materials.

It is understood that sweeter and more flavorful coffee extract can be produced near the beginning of an extraction cycle, when the fresh ground coffee has been in contact for a relatively short period of time with only a relatively small quantity of water, than can be produced later in the extraction process after the coffee has been exposed to additional quantities of water and more exhaustive extraction. Attempts have been made to improve upon the quality and flavor of coffee extracts and instant coffee products produced by large scale extraction processes. One such method described in U.S. Pat. No. 4,534,985 to Gasuu ('985) discloses an industrial scale continuous extraction process and apparatus for the extraction of coffee or tea. The apparatus involves a complex system using a number of extractant beds and extraction zones, where the beds are movable between zones by rotation of the apparatus. The process reduces the total time of the extraction process when compared to more conventional prior art extraction methods. The '985 patent also discloses the use of compressed air or an inert gas in a "recovery station" of the apparatus to maximize recovery of the residual liquid present in the spent grounds after extraction.

Various smaller scale brewing/extraction methods for home or commercial use are known in the prior art for producing beverages from solid raw materials such as coffee, tea and cocoa. Common methods include steeping or infusion in a static volume of hot water (i.e. steeping a tea bag in a cup of hot water), steam-driven percolation, and extraction via a continuous flow of hot water under the force of gravity through a bed of solid extractable material, typically coffee. The latter method described is the one typically employed in home "drip method" coffee makers. All of these methods typically produce a relatively dilute beverage-strength extract (typically, 1 lb of ground, roasted coffee will yield about 320 oz. of beverage-strength extract). In addition, because of the continuous addition of water used to drive the flow of extract through the bed, the beverages produced can contain undesirable quantities of bitter or off-flavor components.

An improvement to most of the above described methods for producing a sweeter, more flavorful, more fragrant, and more concentrated coffee beverage is the espresso method of coffee extraction. The espresso method of extraction typically employs a small-scale home or commercial brewing apparatus utilizing a less exhaustive extraction method to produce a relatively sweet, more concentrated beverage. Typically, a higher ratio of ground coffee to hot water is employed, for example about 1 lb. of ground roasted coffee may typically yield about 64–128 oz of coffee beverage. In order to allow sufficient contact time between water and the ground coffee, the method typically utilizes a finely ground coffee (e.g. 14 gram weight) with hot water being forced through the bed of grounds contained in the brew chamber by additional pressurized hot water. Most typical currently employed espresso type extraction devices are capable of producing only relatively small quantities of extract during each extraction cycle. In addition the quality of the beverage can be very dependant on the grind and packing of the coffee, which dictates the back pressure developed by the flowing water during the extraction, and the extraction time for a given total volume of beverage. A lack of control over these variables can lead to a poor or inconsistent quality of extract. Also, since hot water is typically used to force extract from the bed of ground coffee during the entire extraction process, an undesirable level of extraction may still occur, yielding an extract which is too dilute, and not ideally suited for use as a food or flavor additive without a subsequent, undesirable removal of excess aqueous solvent from the extract.

A variety of small-scale espresso style coffee brewers have been described which attempt to improve upon the performance of conventional espresso brewers. U.S. Pat. No. 5,127,318 to Selby ('318) and U.S. Pat. No. 5,473,973 to Cortese('973) both disclose an apparatus and process for extracting espresso type coffee in which the pressure within the extraction region is regulated by a biased valving arrangement on the outlet line downstream of the coffee bed. The valves are designed to remain closed during the initial pressurization of the extraction chamber by hot water until a preset pressure is reached that can overcome the bias of the regulating valve. When such pressure is reached, the valve opens for flow and maintains a relatively constant pressure in the extraction chamber during the remainder of the extraction process relatively independent of the grind or packing of the coffee. In the disclosed systems, the pressure constantly rises until a predetermined pressure is reached, at which point, flow immediately commences.

U.S. Pat. No. 5,267,506 to Cai ('506) discloses an apparatus for automatically brewing espresso coffee and includes one embodiment where pressurized steam generated by a heating unit is passed through the coffee grounds to purge liquid so that the grounds will not drip when the brew chamber is removed.

U.S. Pat. No. 5,337,652 to Fischer et al. ('652) discloses an espresso machine and method utilizing a biased pressure relief valve down stream of the brewing chamber similar to U.S. Pat. No. 5,127,318 ('318) and U.S. Pat. No. 5,473,973 ('973) described above. The biased valve prevents flow from leaving the discharge line until the pressure within the chamber rises to a fixed predetermined level; immediately thereafter, the valve opens and maintains a relatively constant pressure within the brew chamber during the remainder of the extraction. The '652 system also includes an air pump with an outlet line in fluid communication with the water heating chamber. The air pump is used at the end of the brewing cycle to pump air through the coffee grounds in order to dry the coffee and produce a foamy head. The air from the pump is directed to the brewing chamber from the hot water compartment via a relatively complex automated valving/switching mechanism on a flow control manifold located within the water heating chamber. The air supplied to the brewing chamber in the '652 system passes through the water heating chamber before entering the brewing chamber thus adding heat and moisture to the gas. The '652 system is a relatively low pressure system with a maximum operating pressure disclosed of about 3.5 bar (about 50 psi).

While some of the above cited systems and methods for producing consumable extracts from solid raw materials represent, in some cases, useful contributions to the art of producing consumable extracts, there exists a need for improved methods and systems for producing variable quantities, including large volumes, of consumable extracts, including highly concentrated extracts, from solid raw materials, the extracts having desirable sweetness, flavor, and fragrance characteristics.

SUMMARY OF THE INVENTION

Accordingly, it is an object of the present invention to provide improved methods and apparatus able to controllably produce highly concentrated or less highly concentrated consumable extracts having excellent and desirable sweetness, flavor, and fragrance qualities from solid raw materials.

One aspect of the invention involves a method of extracting a consumable material from a solid raw material. The method involves first forming a quantity of solid raw material in an enclosed volume that is greater than the volume of the solid raw material. An aqueous solvent is then introduced into the enclosed volume. The aqueous solvent is made to flow through the quantity of material to form an aqueous extract from the solid raw material. The flow of aqueous solvent through the quantity of material is discontinued after a predetermined total volume of the aqueous solvent has passed through the material. A flow of a gas is then established through the quantity of material to remove any remaining aqueous extract from the material. The gas is supplied to the enclosed volume through an inlet line that is in fluid communication with the enclosed volume. The gas is supplied from a source of compressed gas external to the enclosed volume.

In another aspect, the invention involves a method for forming an extract containing a consumable material from a solid raw material. The method involves forming a quantity of solid raw material in an enclosed volume that is greater than the volume of the solid raw material. The enclosed volume includes at least one inlet line and one outlet line. With the outlet line closed, the enclosed volume is filled with a predetermined volume of an aqueous solvent. The enclosed volume is then pressurized to a predetermined and controllable pressure by supplying a fluid under pressure from a source of pressurized fluid external to the enclosed volume through an inlet line to the enclosed volume. The pressure is maintained in the enclosed volume under non-flow conditions for a predetermined and controllable period of time. The outlet line is then opened to collect an aqueous extract from the enclosed volume.

In another aspect, the invention provides a method of extracting a solid raw material to form an extract containing a consumable material. The method involves establishing a bed of solid raw material, supplying a volume of aqueous solvent to the bed, pressurizing the solvent and bed to a predetermined and controllable pressured level, maintaining the resulting pressure for a desired period of time under non-flow conditions, and establishing a flow of aqueous extract from the bed. Aqueous extract is then removed from the bed with a gas.

In yet another aspect, the invention provides a method for removing spent extractable solid material from an extraction vessel without the need for disassembly of the vessel. The vessel, according to the invention, encloses an internal volume and has at least one filter element. The vessel is constructed and arranged to contain a desired quantity of solid raw material. The vessel also has at least one inlet flush line and at least one outlet waste line. Prior to performing the method, the vessel contains a quantity of spent solid raw material. The method comprises first flowing a pressurized fluid through at least one inlet flush line, thus entraining and removing, with the flow of pressurized liquid, the spent material through the outlet waste line while essentially simultaneously back flushing the filter element.

In yet another aspect, the invention involves a method for forming a consumable extract from a solid raw material. The method includes at least partially filling an extraction vessel, which encloses an internal volume and has at least one inlet line and at least one outlet line, with a quantity of solid raw material. A flow of liquid solvent is then established through the material to form an extract from the solid raw material. The flow of liquid solvent through the bed is discontinued after a predetermined volume of the liquid solvent has passed through the material. A flow of a gas is then established through the material to remove extract from the material for collection. The gas is supplied to the vessel through an inlet line from a source of compressed gas external to the vessel.

In yet another aspect, the invention provides a method for extracting a solid raw material to form a consumable extract. The method includes at least partially filling an extraction vessel, which encloses an internal volume and has at least one inlet line and at least one outlet line, with a quantity of solid raw material to form a bed of the material. With the outlet line closed, the vessel is filled with a predetermined volume of liquid solvent. The predetermined volume is equal to or greater than the void volume present in the bed. The internal volume of the vessel is then pressurized to a predetermined and controllable pressure by supplying a fluid under pressure from a source of pressurized fluid external to the vessel through an inlet line to the vessel. The pressure in the vessel is maintained under non-flow conditions for a predetermined and controllable period of time before an outlet line is opened to collect the consumable extract from the vessel.

The invention also provides apparatus for forming a consumable extract from a solid raw material. In one embodiment, the apparatus comprises a sealable extraction vessel including an upper surface, a lower surface, and enclosing an internal volume. The upper surface provides fluid communication between an internal volume and one or more lines, which are constructed and arranged for fluid flow therethrough. Each of the lines includes at least one valve, with at least one of the lines being connected to an external source of heated, pressurized water, and at least one other line being connected to an external source of compressed gas when the apparatus is an operable configuration. The lower surface provides fluid communication between the internal volume and at least one line, which is constructed and arranged for fluid flow therethrough and includes at least one controllable valve. The internal volume of the vessel is constructed and arranged to contain a quantity of solid raw material and includes at least one filter element constructed and arranged to retain the material within the vessel during at least part of the extraction operation.

In another aspect, the invention provides an apparatus, which may by flushed-out without the need for disassembly, for forming a consumable extract from a solid raw material. The apparatus comprises a sealable extraction vessel enclosing an internal volume where the internal volume is constructed and arranged to contain a quantity of solid raw material. The internal volume further includes at least one filter element therein, which is constructed and arranged to retain the material within the internal volume during extraction. The internal volume of the vessel is in fluid communication with at least two lines, each constructed and arranged for fluid flow therethrough, with at least one of the lines being connected to an external source of pressurized liquid, and at least one other of the lines being in fluid communication with an outlet port on the vessel and connected to a waste disposal system when the apparatus is in an operable configuration. The lines are positioned in fluid communication with the internal volume of the vessel to enable spent solid raw material to be removed from the vessel through the outlet port, while simultaneously back flushing the filter element, without need for disassembly of the vessel.

The invention also provides an aqueous coffee extract obtained by extraction of a quantity of roasted coffee including at least one chosen variety of roasted coffee and having at least about 6% wt dissolved coffee solids. The extract retains an effective amount of the varietal flavor and fragrance components characterizing the particular variety, or mixture of varieties, of roasted coffee from other varieties.

Other advantages, novel features, and objects of the invention will become apparent from the following detailed description of the invention when considered in conjunction with the accompanying drawings, which are schematic and which are not intended to be drawn to scale. In the Figures, each identical or nearly identical component that is illustrated in various Figures is represented by a single numeral. For purposes of clarity, not every component is labeled in every Figure.

DETAILED DESCRIPTION OF THE INVENTION

Figure 1:
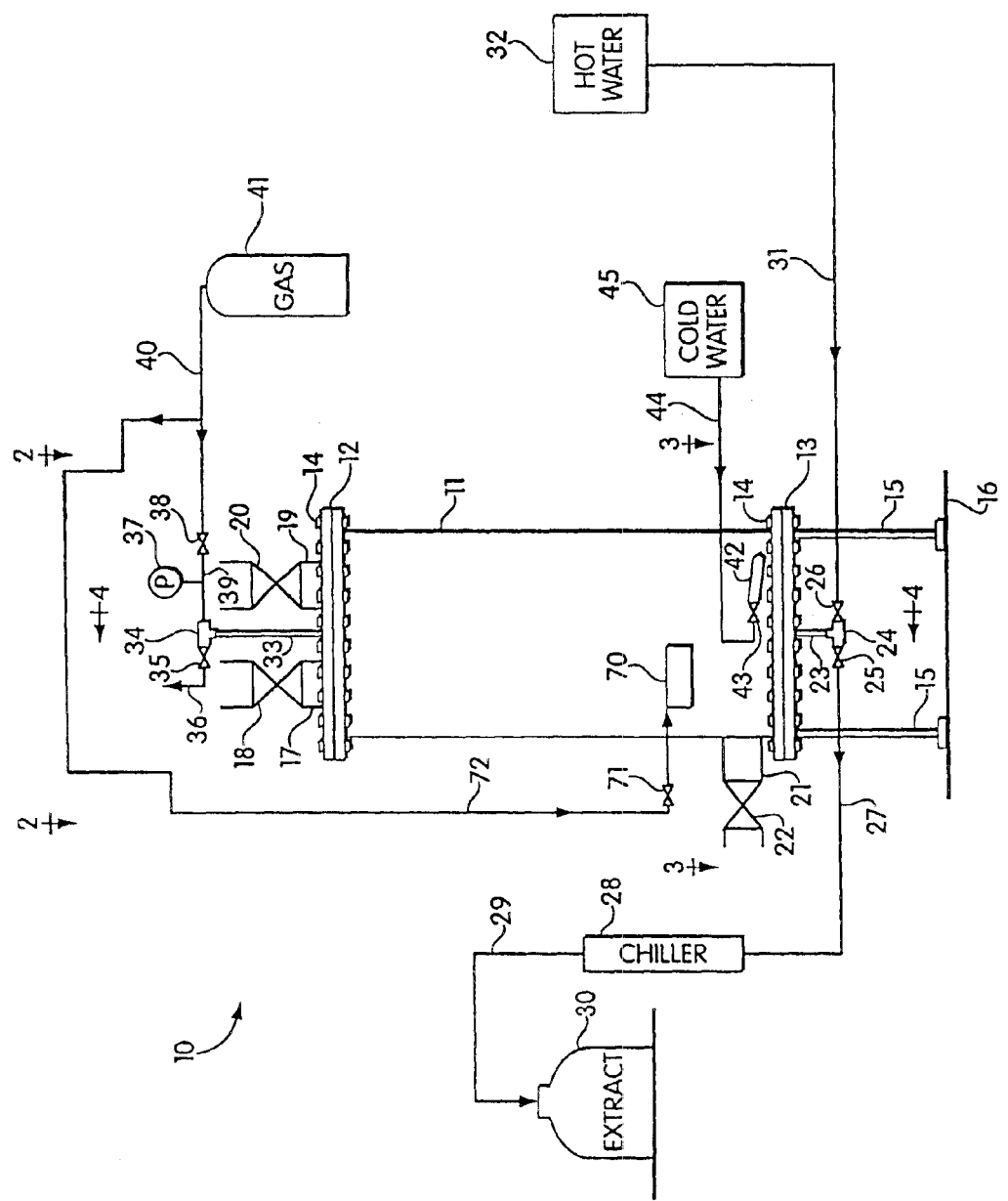
FIG. 1 is a schematic illustration of an apparatus for forming a consumable extract from a solid raw material according to one embodiment of the invention.

The present invention provides methods for forming consumable extracts containing a consumable material from a variety of solid raw materials, which extracts can be of superior quality with regard to flavor and fragrance compared to similar extracts produced according to typical prior art extraction methods. The term "consumable extract" as used herein, refers to a solution containing a dissolved or suspended consumable material in a consumable solvent. A "consumable solvent" refers to an essentially non-toxic, ingestible liquid that has the ability to dissolve or suspend a non-zero quantity of the consumable material. "Consumable material" as used herein, refers to an extractable component of a solid raw material that is extracted by, and can be dissolved or suspended in, the consumable solvent. A "solid raw material" as used herein, refers to a solid material including at least one solid component that is insoluble in the consumable solvent and at least one other component that is a consumable material. Preferred consumable solvents for use in the invention are aqueous solvents. An "aqueous solvent" according to the invention comprises water, and may additionally include other components that are soluble or miscible in the water, which components may be useful or desired for particular applications. When an aqueous solvent is employed in the invention, the consumable extracts produced will be aqueous extracts.

The solid raw materials that may be advantageously employed according to the invention can include a variety of organic solids from which consumable materials can be extracted, for example, tea leaves, cocoa, fruit, vanilla beans, and roasted coffee. While it should be understood that the methods and apparatus described herein in accordance with the invention may be used for any suitable solid raw material, including but not limited to those listed above, to exemplify the method for the purpose of the detailed description, specific reference will be made to roasted coffee.

Unlike typical prior art methods and apparatus for producing aqueous extracts from roasted coffee (i.e. coffee extracts), the current invention enables the production of relatively concentrated coffee extracts that exhibit a high level of sweetness and flavor quality and retain the varietal characteristics specific to the particular variety of coffee being extracted. Unlike typical prior art methods for producing concentrated coffee extracts, for example for use in producing instant coffee, the inventive methods, in many embodiments avoid exhaustive extraction of the roasted coffee, and high water temperatures that lead to hydrolysis (typically above the boiling point of water at atmospheric pressure) both of which can lead to loss of fragrance and extraction of bitter components and acids that can degrade the quality of the flavor and fragrance of the extract. Coffee's best taste is produced during the first part of any brewing (extraction) cycle for typical prior art methods. Rich flavors, sugars, and aroma are extracted first. Oils, acids, and off-fragrances brew out in the later phase of brewing when more extensive extraction has occurred. This, for example, is why percolated coffee beverage and coffee extract produced by exhaustive extraction is often bitter in flavor, has poor aroma, and has oils on the surface.

For applications where coffee extracts having superior fragrance and flavor are typically not considered crucial, for example for production of instant coffee products, exhaustive extraction has been utilized in an attempt to maximize the total yield of consumable material (i.e. soluble coffee solids) that can be obtained from a given quantity of solid raw material (i.e. roasted coffee). However, when reconstituted with water or another solvent to form a coffee beverage or coffee extract for use as a food, flavoring, or fragrance component, such prior art products typically do not provide the flavor and/or fragrance characteristics demanded by consumers who appreciate superior quality coffee. Specifically, these prior art exhaustive extraction methods typically produce coffee extracts that do not retain the desirable varietal flavor and fragrance components that can distinguish extracts produced from coffee grown in one particular region or country or blends of two or more such coffees over other, different varieties. The extracts produced according to the present invention can provide flavor and fragrance attributes that enable them to be utilized in "speciality" coffee applications, and for those embodiments designed for such speciality coffee applications, retain an effective amount of the varietal flavor and fragrance components characterizing the particular variety of roasted coffee from which the extract was produced. The varietal flavor and fragrance components, advantageously retained in coffee extracts produced according to these embodiments of the invention, are relatively volatile extractable chemical compounds, or combinations of chemical compounds, present in the roasted coffee. Different coffee varieties (e.g. Costa Rican Tarrazu vs. Sumatran Mandheling), or defined mixtures or blends of such varieties, will typically possess different relative amounts of and/or types of these varietal flavor and fragrance components that distinguishes the flavors and fragrances of the different brewed coffees. The presence of these varietal flavor and fragrance components is conventionally determined by cupping (taste and smell testing) by those skilled in the art. Unlike typical prior art methods of producing relatively concentrated coffee extracts, which do not contain effective amounts of these varietal components, the present invention can provide relatively concentrated coffee extracts that do retain effective amounts.

"Relatively concentrated coffee extract" as used herein, refers to a coffee extract that is more concentrated than coffee beverage-strength extract (about 1–4% wt dissolved coffee solids) and contains at least about 6% wt dissolved coffee solids. An "effective amount" as used herein in reference to the amount of varietal components retained in a coffee extract refers to a concentration of such components in the extract sufficient to be detected, in the concentrated extract itself or in a coffee beverage obtained by diluting the extract to beverage strength with additional water, by taste and/or smell by one of ordinary skill in the art of cupping (taste-testing) coffee. "Detected" as used above refers to the ability of such a taste tester to distinguish, due to the presence of the varietal components, extracts produced by the same method but from different varieties of roasted coffee. Alternatively, the presence of an effective amount of varietal components can be determined and defined by performing standard chemical analysis on the coffee extracts. Such analysis can be performed by a variety of methods apparent to one skilled in the art, for example, gas chromatography, liquid chromatography, mass spectrometry, etc. An "effective amount" of varietal components as measured by such methods can be defined by comparing the analysis of a beverage-strength extract produced by a typical prior art beverage brewing method, such as the drip method or espresso method, both discussed in more detail herein, with a concentrated extract that has been diluted with additional water to have the same total dissolved solids as the beverage-strength extract to which it is being compared. A diluted concentrated extract so analyzed with an "effective amount" of varietal components, will contain about the same or greater concentration of such components as the beverage-strength extract produced by the typical prior art beverage brewing method.

In addition, because the inventive methods provide a wide flexibility to produce coffee extracts having a wide range of solubles concentration, including highly concentrated extracts, many of the extracts produced according to the invention can be used directly for applications where highly concentrated coffee extracts are desirable, without the need for additional concentration by solvent removal. For example, concentrated coffee extracts produced according to some embodiments of the invention can be used for producing coffee syrups, coffee ice creams, iced coffee beverages, coffee perfume, etc., all of which can display excellent flavor, sweetness, and/or fragrance and maintain the varietal characteristics of the coffee from which the products were produced. The current invention also provides methods and apparatus that are flexible enough to allow for production of a wide variety of extracts having different concentrations and degrees of extraction to suit a variety of purposes and applications. The inventive methods and apparatus are also easily scalable to provide a means for producing any desired quantity of extract. Small-scale versions of the apparatus, according to the invention, could be used for home or retail/commercial use, while larger scale apparatus, more specifically described herein, may be used for industrial production of coffee extracts.

The current invention allows the level of extraction, and concentration of coffee extract to be more precisely controlled than with typical prior art devices and methods. For example, typical drip-style coffee brewers, commonly employed for home and commercial use, typically produce about 2.5 gallons of coffee beverage per 1 lb. of ground roasted coffee, yielding a typical dissolved solids concentration of about 1–1.5% wt. Another popular method of producing coffee beverage is the "espresso method," which typically involves forcing hot water through finely ground, roasted coffee under pressure (typically about 120–140 psig depending on the fineness of the grind and the water flow rate) over a short period of time to create an "espresso beverage." Such methods typically create about 1 gallon of coffee beverage from about 1 lb. of coffee and produce a beverage containing up to about 4% wt dissolved coffee solids. In general, the "espresso method" typically produces a sweeter, more concentrated beverage than the drip method because it utilizes a greater ratio of coffee to water, while also reducing the level of extraction of the raw material (ground coffee). Apparatus for producing coffee beverage according to the espresso method is typically limited to small scale devices having a maximum capacity of about 14 grams of dry, ground roasted coffee. In contrast, the present invention provides, in certain embodiments, methods and apparatus for producing coffee extracts from large quantities, in some embodiments in excess of 300 lb. of roasted coffee. The invention also allows for a variety of coffee extract concentrations to be produced according to the needs of the user by allowing the user to easily adjust the ratio of extract produced to roasted coffee employed according to need. For example, the extracts produced according to the invention can range from those of drip coffee strength (1 lb. dry coffee per 2.5 gallons of extract) or less, to highly concentrated extracts, for example using 2.5 lb., 5 lb, 7 lb of dry coffee or even more, per 1 gallon of extract produced, yielding concentrations of dissolved coffee solids that can be in excess of 10% wt. The flavor and fragrance quality of the extracts produced according to the invention varies according to the degree of dilution and extraction, with the more concentrated extracts typically involving the lowest degrees of extraction and the greatest sweetness and flavor/fragrance quality.

The basic features of the inventive methods for producing consumable extracts from solid raw materials will now be explained in reference to the formation of coffee extracts. Following the basic description, a more detailed description of each step will be given with reference to one illustrative embodiment of an extraction apparatus shown in FIGS. 1–4.

The inventive extraction methods, in some embodiments, are similar, in some respects, to the "espresso method" of coffee extraction previously described. The inventive method utilizes an extraction vessel, chamber, or enclosure having an enclosed internal volume sufficient to contain a desired quantity of solid raw material, for example roasted coffee. A wide variety of extraction vessel sizes and configurations can potentially be employed for various applications as apparent to the skilled artisan. The vessel should be sealable, so that the internal volume can be pressurized to a desired level without undesirable leakage, and have at least one inlet line and at least one outlet line for fluid flow therethrough to enable a continuous flow of solvent through the solid raw material (e.g. coffee) contained within the internal volume of the vessel. The vessel should also have means for filling the internal volume with roasted coffee; for example, the vessel can comprise two or more separable parts that may be separated to expose the internal volume for filling, and/or may have one or more lines through a wall of the vessel and in communication with the internal volume through which roasted coffee may be inserted into the internal volume. The inlet and outlet lines for fluid flow are preferably located on the vessel on opposite sides of the internal volume containing the coffee so that essentially all of the fluid flow entering the vessel through the inlet line and leaving the vessel through the outlet line passes through essentially the entire quantity of coffee as it flows through the vessel. A preferred configuration of the vessel has one or more inlet lines located at or near a top surface of the vessel and one or more extract outlet lines located at or near a bottom surface of the vessel, thus allowing, in preferred embodiments, a flow of aqueous solvent through the coffee to proceed from above the level of the coffee in the internal volume and through the quantity of coffee in the internal volume in the direction of gravity. Such flow through the coffee in the direction of gravity acts to compress the coffee during flow-through extraction and improve contact between the solvent and the coffee, thus improving the extraction process performance as compared to a solvent flow against the direction of gravity or perpendicular to the direction of gravity.

One embodiment of a method for forming a coffee extract according to the invention involves first at least partially, and preferably essentially entirely, filling the internal volume of the vessel with roasted coffee. With the outlet lines closed the vessel is at least partially filled with an aqueous solvent. Preferably, enough aqueous solvent is added to fill the void volume of the quantity of roasted coffee in the vessel and completely cover and wet the roasted coffee. The outlet lines are preferably closed through means of at least one controllable valve. A "controllable valve" as used herein refers to a valve that may be manually or automatically operated, for example by hand turning or computer control and actuation, as desired by an operator to open, close, and/or partially open or close the valve at any desired time and under a variety of desired operating conditions. Such valves may be gate valves, globe valves, ball valves, needle valves, etc. as apparent to the skilled artisan and are distinguished from valves which open and close at one preset condition without operator control, such as, for example, a biased pressure relief valve. In preferred embodiments, the temperature of the aqueous solvent in contact with the coffee is above ambient temperature, most preferably, it is between 190 and 212 degrees Fahrenheit.

Preferred embodiments of the extraction method, subsequent to the filling steps outlined above, next subject the roasted coffee to a novel "pressure-treat" step, which facilitates thorough wetting of the coffee and the elimination of air pockets or channels, as well as penetration of the aqueous solvent into the coffee particles themselves to increase the efficiency of extraction. The pressure-treat step is performed by increasing the static pressure in the vessel containing the the coffee and aqueous solvent to a predetermined and controllable pressure above atmospheric pressure while maintaining the outlet valves in a closed configuration so as to prevent any flow of extract from the vessel. The vessel can be pressurized by addition of additional pressurized aqueous solvent, or alternatively by addition of a pressurized gas to the vessel from an external source of pressurized gas through an inlet line to the vessel. The pressure is maintained for a desired period of time before flow of extract is established. The optimal level of pressure for use in this "pressure-treat" step depends on whether the roasted coffee is in the form of whole beans or ground, the fineness of the grind (for ground coffee), the type of coffee, the degree of roasting, etc., and should be determined by the operator for a given set of conditions to produce an extract with desired characteristics. In general, the coarser the grind of coffee, the higher the pressure should be to yield maximum benefit from the pressure-treatment. It has been found that for ground coffee (e.g. roasted coffee ground using a Bunn coffee grinder (HVG, Bunn-o-matic, Springfield, Ill.) on a setting of 4.0) the pressure during the pressure-treat step is preferably at least 50 psig, more preferably at least 100 psig, and most preferably between about 120 and 132 psig. For embodiments where very coarse ground coffee or whole bean coffee is used, the pressure is preferably higher than this range, for example 150–1000 psig or more. The pressure is maintained under non-flow conditions for a predetermined and controllable period of time before the onset of flow. The time of treatment can vary from several seconds to several minutes, with a typical static pressure treatment time being about 10 min.

Upon completion of the static pressure-treat step, an outlet valve is at least partially opened to establish flow of extract from the vessel, and, for some embodiments, additional aqueous solvent is simultaneously fed to the vessel through an inlet line. The valve on the outlet line can be controlled to maintain a desired level of pressure within the vessel during the flow-through extraction. Thus, the ability of the operator to select and control the pressure in the vessel via control of an outlet valve allows the pressure during extraction and to be adjusted and controlled within the vessel independent of the fineness of the grind of coffee or the inlet solvent flow rate. For embodiments where a very concentrated extract is desired, very little or no additional aqueous solvent is supplied during flow of the extract from the vessel. For other embodiments, a measured, desired quantity of additional aqueous solvent is supplied to yield a desired level of extraction and final extract concentration.

After a desired quantity of additional solvent has been supplied, the flow of solvent is discontinued and extract is collected through the outlet line, typically until the vessel is equilibrated with atmospheric pressure. At this point, in preferred embodiments of the method, residual extract present within the void volume of the ground coffee is removed and recovered by supplying the vessel with a flow of fluid that is a gas (at standard temperature and pressure) through an inlet line to the vessel, which is in direct fluid communication with the enclosed internal volume, from a source of compressed gas external to the vessel. The gas flow to the vessel displaces the extract from the wet coffee, which extract is collected from the outlet line and added to the extract collected during the previous step. Purging the wet coffee with a gas allows the concentrated extract present within the void volume, defined by interstices between and within the wet coffee particles, to be recovered instead of wasted as in typical espresso-type coffee extractors. It also allows for a given volume of extract to be collected with less dilution and a lower degree of extraction when compared to prior art methods where all of the extract collected is forced from the coffee with additional solvent. The gas used to purge the coffee, in preferred embodiments, does not act as a solvent and, therefore, does not further extract or dilute the coffee extract collected. Preferred gases for use in the invention are relatively inert with respect to the solvent, extract, and solid raw material. Compressed air may be used in this context, but particularly preferred gases include oxygen-free inert gases such as nitrogen, or noble gases such as argon, helium, etc. "Inert gas" as used herein, refers to gases that are not reactive with the solid raw material, aqueous solvent, and aqueous extract and that do not significantly affect the flavor or fragrance characteristics of the aqueous extract. It is also preferable to supply the gas to the vessel at ambient or sub-ambient temperature so as to beneficially cool the solid raw material and prevent release of off-flavors/fragrances into the extract.

The steps of the inventive method outlined above may be modified, or certain steps may be deleted, or additional steps added, according to the needs and desires of the operator. For example, in some embodiments of the method, the static pressure-treat step can be omitted. In such an embodiment, after filling the internal volume of the vessel with dry roasted coffee, a continuous flow of aqueous solvent can be established through the coffee whose dynamic pressure drop is controllable by adjustment of the controllable outlet valve on the outlet line through which extract is collected, and/or by controlling the inlet flow rate of aqueous solvent. Then, after supplying a desired predetermined volume of aqueous solvent for extraction, the solvent flow is discontinued and the extract remaining in the wet coffee is purged with a gas as previously described. In some embodiments where a particularly concentrated extract is desired, the predetermined volume of aqueous solvent supplied as described above is essentially equal to the void volume of the bed of the dry, roasted coffee contained within the vessel.

The inventive methods outlined above are also very flexible and can be used to provide a variety of extracts of differing concentration and degree of extraction from a single quantity of solid raw material. For example, the same quantity of solid raw material can be subjected to multiple, repetitive application of the methods described above to produce a variety of extracts from the same given quantity of solid raw material, each extract having a different concentration and flavor/fragrance characteristics indicative of the degree of extraction, with the extracts produced by the first extraction procedure being the most concentrated and having the best flavor/fragrance characteristics, and with subsequent extracts being progressively weaker and more inferior in taste/flavor. Using such a multi-cycle method to perform multiple extractions can allow for custom production of a variety of extracts for a variety of purposes while at the same time increasing the utilization and yield from a given batch of raw material. The modified, multi-cycle method here described is analogous to the production of various quality olive oils (e.g. extra virgin, virgin, etc.) from multiple pressings of the same olives. In the present case, various quality coffee extracts are produced from multiple cycles utilizing the same batch of roasted coffee. It is also contemplated that the extract produced from one cycle of the extraction can be recycled and used as the aqueous solvent for a subsequent extraction cycle either with the same charge of solid raw material or a fresh load of solid raw material.

One embodiment of an industrial-scale extraction apparatus and system 10 for performing the methods according to the invention is shown schematically in FIGS. 1–4. It should be noted that some components that would be apparent to the skilled artisan are not necessarily shown in the figures, and that the particular arrangement of components is only illustrative, which components may be repositioned, or otherwise interconnected or combined as apparent to the skilled artisan. Referring first to FIG. 1, the apparatus includes a cylindrical pressure vessel 11 having a removable top plate 12 and a removable bottom plate 13. The apparatus can be disassembled to allow for inspection, clean out, and/or replacement of internal components. In other embodiments, especially for small-scale systems, the vessel may be a single component that does not disassemble. Top plate 12 and bottom plate 13 are attached to integral flanges on the main cylindrical body 11 via a plurality of connectors 14, which may be of the nut and bolt type. Typically, a sealing gasket or washer will be included between the plates 12 or 14 and the flanges on the body 11 to make a pressure-tight seal. The vessel, and other components in contact with the aqueous extract or aqueous solvent, are preferably constructed of a substance that is relatively inert and non-reactive, such as, for example stainless steel. The pressure vessel 11 is constructed and arranged to withstand maximum foreseeable operating pressures (e.g. at least about 132 psig). In the particular embodiment shown, the vessel 11 is sized to hold about 300 lb. of roasted coffee. The internal volume 75 of the vessel 11, shown in the cross-sectional view of FIG. 4, has an internal diameter of about 24 inches, a height of about 48 inches and a volumetric capacity of about 12.5 cubic feet (about 90 gallons). The vessel is supported on a firm, solid surface 16 by a plurality of support legs 15.

Referring to FIG. 1, coffee, or another solid raw material, is inserted into the vessel 11 through one or both of raw material lines 17 and 19 each in communication with an orifice through top plate 12. Each raw material line includes a valve, 18 on line 17, and 20 on line 19, that may be opened to insert coffee, and subsequently closed to seal the vessel 11. Typically, when inserting the coffee into the vessel 11, the coffee is inserted through at least one valve, while at least one other valve on the apparatus is open to the atmosphere to allow displaced air to escape. The positioning of the raw material lines is more clearly seen in the top view shown in FIG. 2. In other embodiments, the lines may be positioned differently from that shown, or the apparatus may have more, fewer, or no raw material inlet lines. For example, for very large extractors, it may be beneficial to include four, or more, raw material inlet lines to decrease the time required to fill the vessel. For small scale extractors, a single raw material inlet line may suffice, or the vessel may have no raw material inlet lines, in which case, the vessel would need to be disassembled to be filled with solid raw material.

While the vessel 11 is being filled with the solid raw material, it is advantageous to agitate the vessel in order to promote settling of the material within the internal volume 75 of the vessel. For the embodiment shown in FIG. 1, agitation is provided by a gas-operated bin vibrator 70 connected to an external supply 41 of gas via line 72 and valve 71. In preferred embodiments, the bin agitator is located at a location positioned at a distance from the bottom plate 13 about one third the height of the vessel. Other embodiments of the apparatus 10 do not include the bin vibrator. In such embodiments, agitation may be provided if desired, for example, by striking the vessel 11 with a rubber or wooden mallet, or by placing the apparatus on a vibrating platform. Alternatively, instead of distributing and settling the solid raw material through use of agitation, a distributor element could be included within the internal volume 75 of the vessel 11 to accomplish the same purpose.

Figure 2:
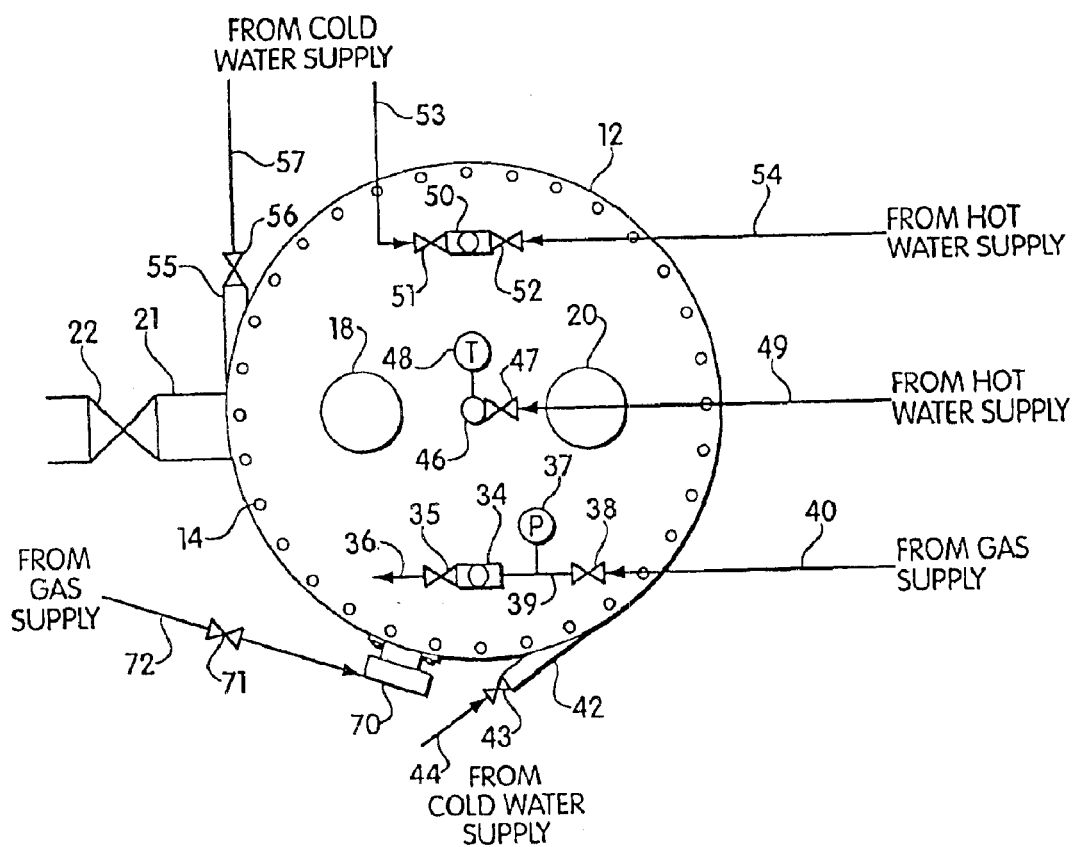
FIG. 2 is a schematic illustration of the apparatus shown in FIG. 1 as viewed from the top.
Figure 4:
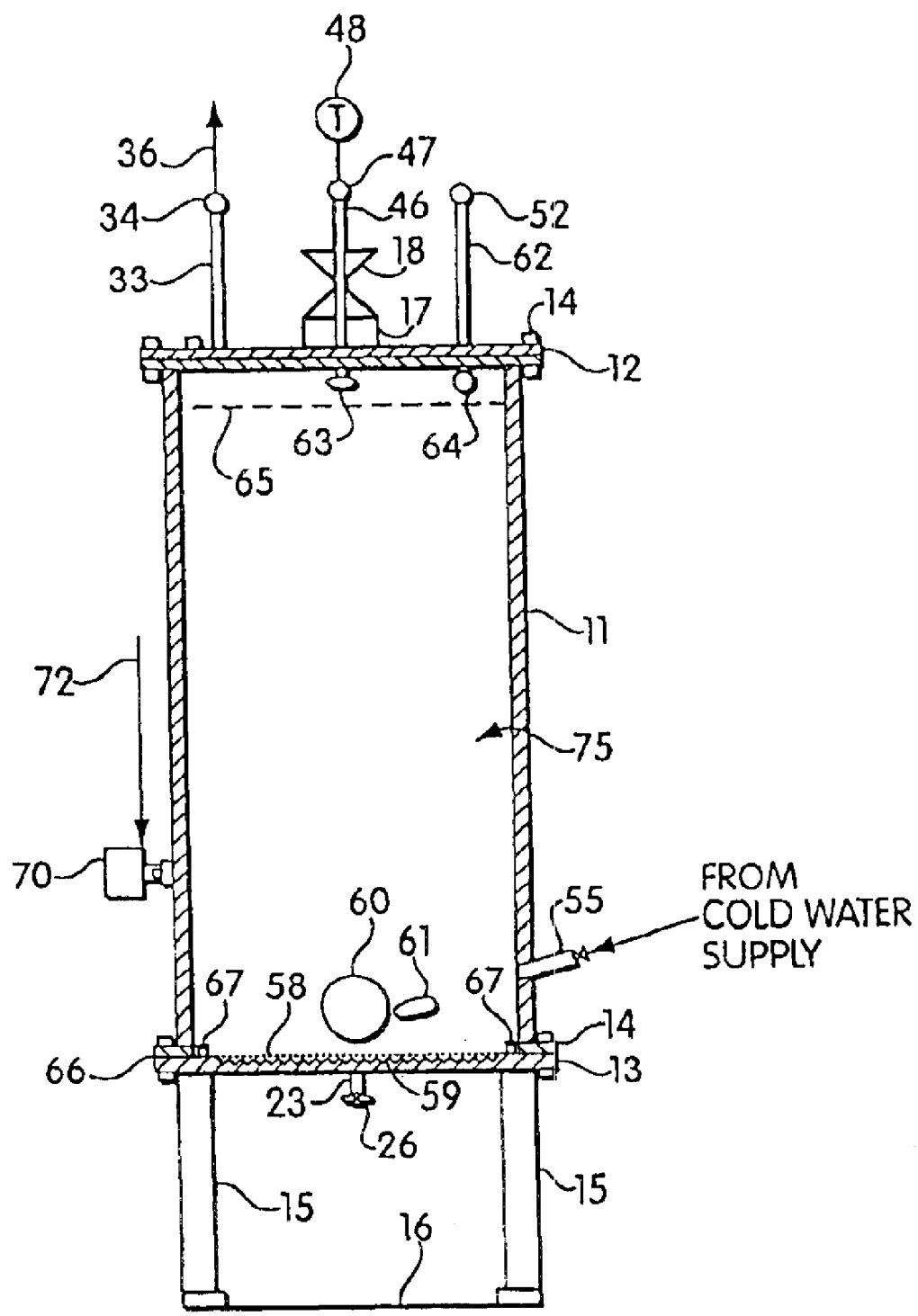
FIG. 4 is a cross-section of the apparatus of FIG. 1 viewed from the side showing the enclosed internal volume and internal components of the vessel.

As shown in FIGS. 1, 2 and 4, the apparatus 10 also includes an aqueous solvent inlet line 46 (see FIGS. 2 and 4) in fluid communication with an external source of hot water 32 via line 49 and valve 47. Included on line 46 is a temperature reading device 48 to measure the temperature of the fluid in line 46 and/or the temperature of internal volume 75 of the vessel 11. In the embodiment shown, the temperature of internal volume 75 of the vessel 11 is controlled by controlling the temperature of the hot water supply 32. In alternative embodiments, vessel 11 may be directly heated, for example by a steam jacket or hot water jacket, or by integral electrical resistance heating or other heating methods apparent to the skilled artisan. As shown in FIG. 4, aqueous solvent inlet line 46 is in fluid communication with spray head 63 located within the internal volume 75 of the vessel 11. Spray head is constructed and arranged to relatively evenly distribute the hot water over the top of the bed of solid raw material formed in the internal volume 75. A variety of industrial spray heads can be used for this purpose, such as a multiple stream solid washing nozzle (Lechler, St. Charles, Ill.). The outlets of the spray head will preferably be positioned above the typical fill line 65 of the bed of solid raw material.

Also included on the top plate 12 of the vessel 11 is a gas inlet/vent line 33 (see FIG. 1) including a tee connector 34. Tee connector 34 is in fluid communication with an external source of compressed gas 41 via lines 39 and 40 and valve 38, and also with the atmosphere via valve 35 and vent line 36. In alternative embodiments, instead of having a single inlet line in fluid communication with both a source of compressed gas and a vent line via a tee connector, the vessel could instead be provided with two separate lines that communicate directly with the internal volume 75 of the vessel. Having a single inlet line in fluid communication with two external lines that are not simultaneously used, as shown, advantageously reduces the number of perforations that need to be made in the plates 12 and 13 of the vessel 11. While filling the internal volume 75 of the vessel 11 with aqueous solvent through line 46, line 33 can be used to vent or "burp" displaced air from the vessel by closing valve 38 and opening valve 35. While pressurizing the internal volume 75 of the vessel during the pressure-treat step or while purging residual extract from the bed after extraction, line 33 acts as a gas inlet line by closing valve 35 and opening valve 38. Line 39 includes a pressure measuring device 37 that is used to measure the pressure of the internal volume 75 of the vessel 11 during operation.

As shown in FIG. 1, included on bottom plate 13 is an extract outlet line 23 in fluid communication with the internal volume 75 of the vessel 11 via a drain hole in bottom plate 13. Aqueous extract exits vessel 11 via line 23 passes through tee 24, controllable valve 25, and line 27 to a chiller 28 that reduces the temperature of the extract to a temperature below room temperature to prevent degradation to the flavor and/or loss of fragrance. The chilled extract exits chiller 28 via line 29 and is collected in container 30. Also in fluid communication with tee 24 and line 23 via valve 26 and line 31 is hot water supply 32; these lines are used in connection with the novel spent material flush out methods described in more detail below.

Figure 3:
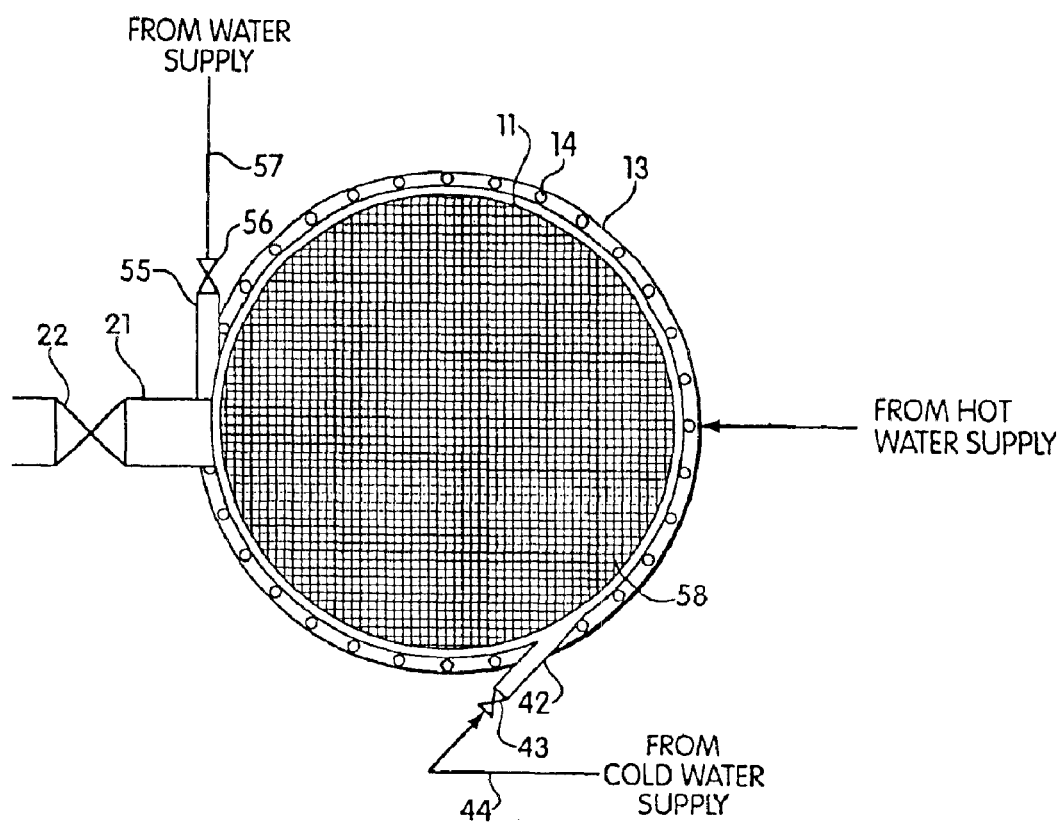
FIG. 3 shows a cross-section of the apparatus in FIG. 1 as viewed from the top showing one embodiment of a filter element comprising a porous screen.

In order to prevent the solid raw material from exiting the vessel via line 23 during flow-through extraction, a filter element is included within vessel 11 upstream of line 23. A preferred arrangement of filter element is shown in FIG. 3 and, in cross-section, in FIG. 4. The preferred filter element includes of a porous screen 58 having perforations that are small enough to retain essentially all of the solid raw material. As shown more clearly in FIG. 4, porous screen 58 is supported by bottom plate 13, which plate includes a plurality of channels and grooves 59 constructed and arranged to direct the flow of aqueous extract that passes through porous screen 58 to aqueous extract outlet line 23. Porous screen 58 provides a support, and means of retention for the bed of solid raw material and has a diameter that is preferably essentially equal to the internal diameter of vessel 11. Porous screen 58 can be attached to bottom plate 13 via screws 67, or any other appropriate connecting means. In some other embodiments, the filter element may be positioned elsewhere in the internal volume 75. In other embodiments, the filter element could be a smaller screen or filter positioned directly upstream of, or even within extract outlet line 23. A wide variety of arrangements of the filter element are possible as would be apparent to the skilled artisan; all of which are included within the spirit and scope of the invention.

As previously mentioned, extraction apparatus 10 also includes a novel arrangement of components for flushing spent solid raw material from the internal volume 75 of the vessel 11, and for cleaning out the vessel after an extraction has been performed and prior to a subsequent extraction. The arrangement of components illustrated allows spent raw material to be flushed from extraction apparatus 10, and allows for clean-out without the need for disassembly of the apparatus. In the illustrated embodiment, as shown in FIG. 1, the wash-out system includes spent material outlet waste line 21, including valve 22, that is in fluid communication with a waste collection system, such as a sewer. As shown in FIG. 4, outlet port 60, opening into the internal volume 75 of the vessel 11 from line 21, is preferably positioned directly above porous screen 58. The preferred wash out configuration includes a fluid supply line constructed and arranged to back-flush the filter element. In the illustrated embodiment, the back flush is performed through line 23 by first closing valve 25, and then opening valve 26 so that a fluid, in the illustrated embodiment hot water from pressurized hot water supply 32, will enter the vessel 11 via line 23, which now acts as an inlet flush line, and thereby back flush the porous screen 58. Typically, valve 22 will be open during the flush-out procedure to allow spent material to be removed from the vessel 11; although, in some embodiments, valve 22 may be closed during at least part of the flush-out procedure to allow the internal volume 75 of the vessel 11 to at least partially fill with liquid in order to disperse and fluidize the spent material. In alternative embodiments, line 31 may also be in fluid communication with a source of pressurized gas. In such embodiments, either gas, liquid, or a two-phase gas-liquid fluid can be used to back flush the filter element and wash out the spent solid raw material.

Also included in the preferred embodiment are additional tangential flush lines 42 and 55 (see FIGS. 1 and 3) which are in fluid communication with a source of pressurized water 45 via valve 43 and line 44 for flush line 42, and valve 56 and line 57 for flush line 55. Both lines 42 and 55 are positioned to be roughly tangent to the cylindrical wall of vessel 11 with openings (e.g. see FIG. 4 for opening 61 of line 55) into the internal volume 75 of the vessel 11 positioned vertically above the porous screen 58 at about the same height as the outlet port 60 to spent material outlet line waste 21. The tangential orientation of the flush lines 42 and 55 with respect to the vessel walls tends to create a swirling, vortex-like flow pattern of wash fluid within the vessel, which assists in thoroughly removing the spent material from the vessel 11 via line 21. In addition, at least one of the tangential flush lines (line 55 in the illustrated embodiment) is preferably positioned so that the opening 61 of the line in the vessel wall directs a stream of flush fluid obliquely incident upon the outlet port 60, through which spent material exits the vessel 11, in order to drive the slurried material through line 21 to waste and prevent plugging of outlet port 60. In other embodiments, more than two tangential flush lines may be used to improve removal of spent material, for example for very large extractors, or alternatively only a single line may be used. For small extractors, tangential flush lines are typically not required to effectively remove the spent material from the vessel.

Also included in the illustrated embodiment, and seen most clearly in FIGS. 2 and 4, is a wash down line 62 through top plate 12. Wash down line 62 is in fluid communication with a supply of pressurized cold and hot water via tee 50, and valve 51 and line 53 (cold water), or valve 52 and line 54 (hot water). Wash down line 62 is preferably connected to a rotating spray nozzle 64 that is positioned within internal volume 75 of the vessel 11. Rotating spray nozzle 64, when supplied with pressurized fluid, will rotate and spray fluid in order to effectively wash down the walls and internal surface of the top plate 12 and the vessel 11. A variety of commercially available rotating spray nozzles can be used for this purpose. The illustrated embodiment employs a whirling tank nozzle (Lechler, St. Charles, Ill.). Embodiments involving very large extraction vessels may include additional wash down lines and rotating spray nozzles, while small extraction vessels may not require such a line. In some embodiments, the water employed for washing purposes may include one or more cleaning and/or corrosion inhibiting agents as known in the art.

Operation of the Apparatus

With reference to the figures, an exemplary coffee extraction procedure using the above described apparatus can proceed as follows. At the start of the procedure, all valves are in a closed position. The vessel 11 is then preheated by opening valve 52 to establish a flow of pressurized hot water into the vessel through rotating spray nozzle 64. When the pressure within the vessel, as read by pressure measuring device 37, is approximately equal to that of the hot water supply pressure, valve 25 downstream of extract outlet line 23 is opened to establish a flow of hot water to chiller 28, and then valve 52 is closed. Valve 38 is then opened to supply pressurized gas to the vessel via line 33. The gas flow is maintained until no more liquid is observed leaving chiller 28 via line 29. The gas flow is then discontinued by closing valve 38, and the vessel is equilibrated to atmospheric pressure. Valve 25 downstream of extract outlet line 23 is left open.

A desired quantity of dry coffee is next added to the vessel by opening valves 18 and 20 on raw material lines 17 and 19 and pouring coffee into the vessel through lines 17 and 19 until vessel is essentially full. The dry coffee can then be settled by opening valve 71 to supply gas flow to bin vibrator 70, or alternatively, tapping the vessel with a mallet. Alternatively, the coffee can be settled without agitation of the vessel by briefly opening valve 52 to apply hot water to the coffee at one or more intervals during the addition of dry coffee, or after the coffee has been added, to moisten and settle the coffee. If desired, more coffee may now be added to more completely fill the vessel before closing valves 18 and 20. Valve 47 is then partially opened to supply pressurized hot water to the vessel via aqueous solvent inlet line 46. Upon the first sign of extract discharge from line 29, valve 25 downstream of extract outlet line 23 is closed and the vessel is filled with a desired quantity of hot water. Valve 35 on vent line 36 is at least partially opened at some point during the process of filling the vessel with water to "burp" out air; the valve 35 is closed when extract is observed to flow from line 36. The volume of hot water added to the coffee is preferably equal to or greater than the void volume of the bed of coffee so that all of the coffee is wetted. In some embodiments, the volume is essentially equal to the void volume present in the bed. The vessel is then further pressurized, either with pressurized hot water by opening valve 47, or with pressurized gas by opening valve 38, to a desired pressure (typically about 120–132 psig) for performing the static pressure-treat step. The pressure is maintained in the vessel without flow for a desired period of time (typically about 10 min). Next, valve 25 downstream of the extract outlet line 23 is controllably opened to initiate a desired flow rate of extract through line 27 and chiller 28 and into collection container 30. For some embodiments during this step, depending on the desired strength of the extract and degree of extraction, valve 47 can be opened and a measured quantity of hot water can be added to the vessel to further extract the coffee within the vessel via a flow-through extraction step. During such flow-through extraction, the pressure within the vessel can be controlled by adjusting valve 25 on the extract outlet line 23, and/or valve 47 on the hot water inlet line 46. For embodiments where additional hot water has been added after the pressure treat step, after the desired quantity of additional solvent water has been supplied during the flow-through extraction, valve 47 is closed to discontinue flow from the hot water supply. Valve 38 is then opened so that compressed gas enters the vessel via line 33 in order to purge residual extract from the void volume of the bed of coffee. Valve 47 is closed when gas flow is observed from extract collection line 29. At this point, extraction is complete and the vessel may be reused for a subsequent extraction with the same charge of coffee, or the spent coffee can be removed from the vessel. For embodiments where a maximum-strength extract is desired, the extract can be purged from the bed with the gas flow immediately after the pressure-treat step without supplying additional hot solvent water for a flow-through extraction step.

In order to remove the spent grounds from the vessel, valve 25 on the extract outlet line 23 is closed and valve 22 on spent material waste line 21 is opened. Valve 26 is then opened to back flush the porous screen 58 with pressurized water through line 23; valves 43 and 56 are opened to supply pressurized water flow to tangential flush lines 42 and 55 respectively, and valve 51 or 52 is opened to supply pressurized cold or hot water to rotating spray nozzle 64 via line 62. After the flow of liquid exiting the waste line 21 is observed to be clear and clean, the valves supplying pressurized water to the various lines for flush out are closed; valve 22 on waste line 21 is closed, and the process is complete. The extract exit line 27, chiller 28, and extract collection line 29 can also be flushed by opening valve 25 followed by valve 26 to direct pressurized water from source 32 through line 31, valve 26, tee 24, valve 25, line 27, chiller 28, and line 29.

The function and advantage of the invention will be more fully understood from the example below. The following example is intended to illustrate the operation of the invention, but not to exemplify the full scope of the invention.

EXAMPLE

The industrial scale extractor described in connection with FIGS. 1–4 was used to produce a coffee extract using the methods described in the preceding sections with the modifications indicated below. Approximately 265 lbs. of a blend of Costa Rican, Colombian, and Sumatran coffee beans, roasted to a medium dark finish, were ground using a Bunn coffee grinder (HVG, Bunn-o-matic, Springfield, Ill.) on a setting of 4.0. A Rotap sieve analysis indicated an 80% retention in Tyler sieves 12, 16, and 18, with the remaining 20% distributed across sieves 20, 30, 40, 45, and the bottom tray.

The vessel was filled with the dry ground coffee forming a bed and the system was wetted with hot water, from a supply maintained at 193 degrees F. and 90 psig, as described above. Valve 25 on the extract outlet line 23 was then closed and about 40 gallons of the hot water was added to the vessel via inlet line 46 yielding a final vessel pressure of about 90 psig. the vessel was then "burped" to remove excess air as previously described and then pressurized to about 120 psig with pressurized air. The coffee was "pressure-treated" at this pressure without flow for about 10 min, at which time, valve 25 was opened to allow the extract to flow from the vessel, through a stainless steel heat exchanger (chiller 28) operated to lower the temperature of the exiting extract from about 165 degrees to about 55 degrees F. in approximately 2 min, and into a collection container. When the pressure in the vessel dropped to about 90 psig, the hot water supply to the vessel was reestablished by opening valve 47 on aqueous solvent inlet line 46. An additional 90 gallons of hot water were then passed through the bed of coffee before closing valve 47. When no more extract was observed flowing from the vessel, pressurized air was supplied to the vessel at 120 psig to purge residual extract from the bed for collection. The total yield of extract was about 100 gallons from the 265 lb. of dry coffee.

The extract was judged by taste and smell testing to have exceptional sweetness with a clear coffee flavor retaining the varietal components, and substantially free of acidic off-flavors. The extract had a Brix reading of about 8.0 (about 6.5%, dissolved solubles) and can be reconstituted with about 4–5 lb. water per pound of extract to yield a coffee beverage of normal drip brew strength, but with superior sweetness and flavor.

While the invention has been shown and described above with reference to various embodiments and specific examples, it is to be understood that the invention is not limited to the embodiments or examples described and that the teachings of this invention may be practiced by one skilled in the art in various additional ways and for various additional purposes.

What is claimed is:

1. A method of extracting a consumable material from a solid raw material comprising acts of:
   providing a quantity of solid raw material in a surrounding gaseous environment at essentially atmospheric pressure;
   supplying an aqueous solvent to the quantity of solid raw material in the surrounding gaseous environment at essentially atmospheric pressure, so as to at least partially replace the gaseous environment surrounding the raw material with the aqueous solvent, thereby forming a combination of the solvent and the solid raw material;
   pressurizing the combination of the solvent and the quantity of solid raw material to a pressure level of at least about 50 psig;
   exposing the quantity of solid raw material to the pressurized solvent and maintainining the pressure level for a desired period of time under non-flow conditions; and
   establishing a flow of an aqueous extract from the quantity of solid raw material.

2. The method of claim 1, wherein the aqueous extract comprises at least 10 % wt dissolved consumable material.

3. The method of claim 2, wherein in the providing act, the material is formed as a bed.

4. The method of claim 2, wherein said solid raw material is roasted coffee.

5. The method of claim 2, wherein in the supplying act, the volume of aqueous solvent is equal to or greater than the void volume present in said bed.

6. The method of claim 4, wherein said roasted coffee is ground.

7. The method of claim 4, wherein said roasted coffee is unground.

8. The method of claim 7, said roasted coffee is whole bean coffee.

9. The method of claim 4, wherein said roasted coffee is an Arabica coffee.

10. The method of claim 2, wherein said aqueous solvent is water having a temperature exceeding room temperature.

11. The method of claim 10, where the temperature of said water is between 190 and 212 degrees F.

12. The method of claim 2, further comprising repeating the providing, supplying, pressurizing, exposing, and establishing acts and using said aqueous extract as the aqueous solvent in the supplying act.

13. The method of claim 2, wherein in the pressurizing act, the solvent and the quantity of solid raw material are pressurized to a pressure level of at least about 100 psig.

14. The method of claim 13, wherein in the pressurizing act, the solvent and the quantity of solid raw material are pressurized to a pressure level of at least about 120 psig.

15. The method of claim 2, wherein in the pressurizing act, the solvent and the quantity of solid raw material are pressurized to a pressure level of between about 120 psig and about 132 psig.

16. The method of claim 13, wherein in the pressurizing act, the solvent and the quantity of solid raw material are pressurized to a pressure level of at least about 150 psig.

17. The method of claim 16, wherein in the pressurizing act, the solvent and the quantity of solid raw material are pressurized to a pressure level of at least about 1000 psig.

18. The method of claim 2, wherein in the pressurizing act, the solvent and the quantity of solid raw material are pressurized to a pressure level of between about 150 psig and about 1000 psig.

19. The method of claim 2, wherein in the providing act, the quantity of solid raw material is provided in an enclosed container, and wherein in the pressurizing act, the enclosed container containing the combination of the solvent and the quantity of solid raw material is pressurized to the pressure level.

20. The method of claim 19, wherein in the pressurizing act, the combination of the solvent and the quantity of solid raw material is pressurized to the pressure level by supplying a fluid under pressure to the enclosed volume.

21. The method of claim 20, wherein the fluid under pressure comprises pressurized aqueous solvent.

22. The method of claim 20, wherein the fluid under pressure comprises a pressurized inert gas.

23. The method of claim 19, wherein in the establishing act, the enclosed container and the combination of the solvent and the quantity of solid raw material is depressurized from the pressure level by opening an outlet valve of the enclosed container and initiating a flow of the aqueous extract, which is driven, at least in part, by the pressure within the enclosed container.

24. A method of extracting a consumable material from a solid raw material comprising acts of:

providing a quantity of solid raw material in an enclosed container;

supplying an aqueous solvent to the enclosed container and the quantity of solid raw material, thereby forming a combination of the solvent and the solid raw material;

pressurizing the enclosed container and the combination of the solvent and the quantity of solid raw material to a pressure level of at least about 50 psig;

exposing the quantity of solid raw material to the pressurized solvent and maintaining the pressure level for a desired period of time under non-flow conditions; and depressurizing the enclosed container and the combination of the solvent and the quantity of solid raw material from the pressure level by opening an outlet valve on an outlet line of the enclosed container and establishing a flow of an aqueous extract from the quantity of solid raw material through the outlet line, which flow is driven, at least in part, by the pressure within the enclosed container.

25. The method of claim 24, wherein the aqueous extract comprises at least about 10 % wt dissolved consumable material.

26. The method of claim 25, wherein the solid raw material is roasted coffee.

27. The method of claim 26, wherein the roasted coffee is ground.

28. The method of claim 26, wherein the roasted coffee is unground.

29. The method of claim 24, wherein the aqueous solvent is water having a temperature between 190 and 212 degrees F.

30. The method of claim 25, wherein the enclosed container has an internal volume that remains essentially constant during performance of the method.

31. The method of claim 25, wherein during the depressurizing act, the aqueous extract is collected through the outlet line until the pressure in the enclosed container is equilibrated with atmospheric pressure.

32. A method of extracting a consumable material from a solid raw material comprising acts of:

providing a quantity of solid raw material in a surrounding gaseous environment at a first pressure;

supplying an aqueous solvent at a second pressure substantially different than the first pressure to the quantity of solid raw material, thereby forming a combination of the solvent and the solid raw material;

pressurizing the combination of the solvent and the quantity of solid raw material to a pressure level of at least about 50 psig;

exposing the quantity of solid raw material to the pressurized solvent and maintaining the pressure level for a desired period of time under non-flow conditions; and establishing a flow of an aqueous extract from the quantity of from the quantity of solid raw material.

33. The method of claim 32, wherein the aqueous extract comprises at least about 10 % wt dissolved consumable material.

34. The method of claim 33, wherein the solid raw material is roasted coffee.

35. The method of claim 34, wherein the roasted coffee is ground.

36. The method of claim 34, wherein the roasted coffee is unground.

37. The method of claim 34, wherein the aqueous solvent is water having a temperature between 190 and 212 degrees F.

* * * * *